US009805892B2

(12) United States Patent
Kawamura

(10) Patent No.: US 9,805,892 B2
(45) Date of Patent: Oct. 31, 2017

(54) ELECTRONIC COMPONENT AND ELECTRONIC COMPONENT ASSEMBLY STRUCTURE

(71) Applicant: YAZAKI CORPORATION, Minato-ku, Tokyo (JP)

(72) Inventor: Yukihiro Kawamura, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/872,573

(22) Filed: Oct. 1, 2015

(65) Prior Publication Data

US 2016/0027599 A1    Jan. 28, 2016

Related U.S. Application Data

(63) Continuation of application No. PCT/JP2014/059815, filed on Apr. 3, 2014.

(30) Foreign Application Priority Data

Apr. 15, 2013  (JP) ................................ 2013-085178

(51) Int. Cl.
*H01H 45/14* (2006.01)
*H01R 13/11* (2006.01)
(Continued)

(52) U.S. Cl.
CPC ............ *H01H 45/14* (2013.01); *H01H 45/04* (2013.01); *H01H 50/048* (2013.01);
(Continued)

(58) Field of Classification Search
CPC ............................ H01R 12/24; H01R 13/5284
(Continued)

(56) References Cited

U.S. PATENT DOCUMENTS

| 6,764,314 B1* | 7/2004 | Lee ........................ H01R 12/57 439/65 |
| 7,775,832 B2* | 8/2010 | Watanabe .............. H01R 13/41 439/603 |

(Continued)

FOREIGN PATENT DOCUMENTS

| JP | S63-146939 U | 9/1988 |
| JP | 01-235360 A | 9/1989 |

(Continued)

OTHER PUBLICATIONS

Chinese Office Action No. 201480021208; dated Oct. 19, 2016 with English language translation.

(Continued)

*Primary Examiner* — Alexander Gilman
(74) *Attorney, Agent, or Firm* — Sughrue Mion, PLLC

(57) ABSTRACT

An electronic component includes a component main body having a rectangular parallelepiped shape and a plurality of lead terminals, and each lead terminal is disposed to droop along a side surface of the component main body facing the lead terminal. The plurality of lead terminals having different rigidities are arranged in a width direction of at least one side surface of the component main body, and the lead terminal having a highest rigidity among the plurality of lead terminals is disposed to protrude more in a direction in which it gets apart from the corresponding side surface of the component main body than the other lead terminals. Accordingly, it is possible to prevent deformation of the lead terminal.

5 Claims, 9 Drawing Sheets

(51) Int. Cl.
  *H01H 45/04* (2006.01)
  *H01H 50/04* (2006.01)
  *H02G 3/16* (2006.01)
  *H01R 4/18* (2006.01)
  *H01R 13/629* (2006.01)
  *H01H 50/14* (2006.01)
  *H01H 50/44* (2006.01)

(52) U.S. Cl.
  CPC ........... *H01R 13/113* (2013.01); *H01H 50/14* (2013.01); *H01H 50/443* (2013.01); *H01H 2050/049* (2013.01); *H01R 4/185* (2013.01); *H01R 13/629* (2013.01); *H02G 3/16* (2013.01)

(58) Field of Classification Search
  USPC .................................................... 439/620.24
  See application file for complete search history.

(56) References Cited

U.S. PATENT DOCUMENTS

| | | | | |
|---|---|---|---|---|
| 7,938,665 | B2* | 5/2011 | Fan .................... | H05K 7/1061 439/326 |
| 8,845,339 | B2* | 9/2014 | Ono .................... | H01R 12/7052 439/74 |
| 8,936,474 | B2* | 1/2015 | Katsuse .............. | H01R 9/223 439/701 |
| 8,979,565 | B2* | 3/2015 | Yeh ..................... | H01R 12/88 439/331 |
| 9,293,290 | B2* | 3/2016 | Hirasawa ........... | H01H 85/2035 |
| 2002/0105061 | A1 | 8/2002 | Abe et al. | |
| 2006/0189183 | A1* | 8/2006 | Yang .................. | H01R 13/5025 439/95 |
| 2009/0221158 | A1 | 9/2009 | Fan et al. | |
| 2013/0012039 | A1* | 1/2013 | Nose ................... | H01R 12/716 439/74 |
| 2013/0043971 | A1 | 2/2013 | Chen et al. | |
| 2013/0237078 | A1 | 9/2013 | Ikeda et al. | |

FOREIGN PATENT DOCUMENTS

| | | |
|---|---|---|
| JP | 04-239165 A | 8/1992 |
| JP | H09-140029 A | 5/1997 |
| JP | 11-135702 A | 5/1999 |
| JP | 2002150883 A | 5/2002 |
| JP | 3838021 A | 8/2006 |
| JP | 2010-016943 A | 1/2010 |
| JP | 2010-221787 A | 10/2010 |
| JP | 2012-119292 A | 6/2012 |
| TW | 341949 U | 1/2006 |

OTHER PUBLICATIONS

International Search Report for PCT/JP2014/059815 dated Jun. 24, 2014 [PCT/ISA/210].
Written Opinion for PCT/JP2014/059815 dated Jun. 24, 2014 [PCT/ISA/237].
Communication dated Feb. 21, 2017 issued by the Japanese Patent Office in counterpart Japanese application No. 2013-085178.
Communication dated Sep. 5, 2017, from Japanese Patent Office in counterpart application No. 2013-085178.

* cited by examiner

ELECTRONIC COMPONENT AND ELECTRONIC COMPONENT ASSEMBLY STRUCTURE

CROSS-REFERENCE TO RELATED APPLICATION

This application is a continuation application of International Application PCT/JP2014/059815, filed on Apr. 3, 2014, and designating the U.S., the entire contents of which are incorporated herein by reference.

BACKGROUND OF THE INVENTION

1. Field of the Invention

The present invention relates to an electronic component and an electronic component assembly structure, and more particularly, to an electronic component assembly structure provided to an electrical junction box which is mounted on a moving object such as an automobile.

2. Description of the Related Art

In general, a moving object such as an automobile is equipped with an electrical junction box in which an electronic component such as a relay is accommodated to control connection between a power supply device and an electric component (see Japanese Patent Application Laid-open No. 2010-221787).

FIG. 9 is a longitudinal-sectional view of a relay module according to the related art. As illustrated in FIG. 9, a relay 1 according to the related art includes a relay main body 2 formed in a rectangular parallelepiped shape and plural plate-like lead terminals 3 protruding in a straight line shape from one surface (bottom surface) of the relay main body 2. Such a type of relay is assembled into a resinous holding member 6, which holds terminal fittings 5 connected to electrical wires 4, to constitute a relay module. The relay module is assembled into an electrical junction box. Each terminal fitting 5 is provided with a spring portion 7 to which the lead terminal 3 is fitted. The relay 1 is held by the holding member 6 by inserting tips of the plural lead terminals 3 into the spring portions 7. In FIG. 9, the relay module according to the related art is basically illustrated in a longitudinal-sectional view but only the relay main body 2 is illustrated in a side view.

However, since such a type of relay module is assembled in a state in which the relay main body 2 is placed on an end surface (top surface) of the holding member 6, for example, the height dimension (in the up-down direction in FIG. 9) of the relay module increases.

Therefore, for example, as illustrated in FIG. 10, it can be considered that each lead terminal 12 of a relay 11 is bent and formed in an L shape. FIG. 10 is a side view illustrating an example of a relay. Each lead terminal 12 includes a base end 14 protruding from a side surface of a relay main body 13 having a rectangular parallelepiped shape and a contact portion 15 drooping along the side surface of the relay main body 13 from which the base end 14 protrudes. According to this configuration, since the relay main body 13 can be accommodated in an opened box-like housing member (not illustrated) by inserting the relay 11 into the housing member in the arrow direction and fitting the lead terminals 12 (contact portions 15) to the terminal fittings held in the housing member, it is possible to reduce the height dimension of the relay module.

For example, a case where a relay is transported in a state in which the relay is assembled into a housing member and a case where a relay is transported alone can be considered as a transport form of such a relay. When a relay is transported in a state in which the relay is assembled into a housing member, lead terminals weak to an external force are protected by the housing member. However, when a relay is transported alone, exposed lead terminals may be deformed with an external force.

SUMMARY OF THE INVENTION

The present invention is made in consideration of the above-mentioned problem and an object thereof is to suppress deformation of a lead terminal.

In order to solve the above-mentioned problems, an electronic component according to one aspect of the present invention includes a component main body having a rectangular parallelepiped shape, and a plurality of lead terminals. Herein, each of the lead terminals is disposed to droop along a side surface of the component main body facing the lead terminal, and the plurality of the lead terminals having different rigidities are arranged in a width direction of at least one side surface of the component main body, and the lead terminal having a highest rigidity among the plurality of the lead terminals is disposed to protrude more in a direction in which it gets apart from the corresponding side surface of the component main body than the other lead terminals.

In this case, since the lead terminal having a highest rigidity can be inserted into the terminal fitting earlier than the other lead terminals, it is possible to reduce a load in inserting the lead terminal having a relatively low rigidity and thus to prevent deformation of the lead terminal.

Further, in order to solve the above-mentioned problems, an electronic component assembly structure according to another aspect of the present invention, the electronic component assembly structure includes an electronic component which includes a component main body having a rectangular parallelepiped shape and a plurality of lead terminals, a housing member in which the electronic component is inserted and accommodated, and a plurality of terminal fittings which are held in the housing member and to which the plurality of the lead terminals are fitted. Herein, each of the lead terminals is disposed to droop along a side surface of the component main body facing the lead terminal. Further, the plurality of the lead terminals having different rigidities are arranged in a width direction of at least one side surface of the component main body, and the lead terminal having a highest rigidity among the plurality of the lead terminals is disposed to protrude more in a direction in which it gets apart from the corresponding side surface of the component main body than the other lead terminals. Further, the plurality of the terminal fittings are positioned such that the lead terminal having a highest rigidity among the plurality of the lead terminals arranged in the width direction of one side surface of the component main body is first inserted therein. Further, the electronic component is inserted and accommodated in the housing member, the plurality of the lead terminals come in contact with the plurality of the terminal fittings, respectively, and the electronic component is assembled into the housing member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an electronic component assembly structure according to the present invention will be described with reference to the accompanying drawings. In this embodiment, a relay module in which a relay is used as an electronic component and the relay is accommodated in a housing member will be described, but the electronic component assembly structure according to the present invention can be applied to electronic components other than the relay.

The use of the relay module according to this embodiment is not particularly limited, but a case can be considered in which the relay module is used for equipment or the like for controlling a connection state between a power supply device and an electric component in a moving object such as an automobile. Specifically, for example, it can be considered that the relay module is introduced into an electrical junction box (junction box) disposed between an electric component and a battery which are mounted on an automobile and is used as a relay module for controlling input and cutoff of power. Such a type of relay module may be integrally formed with the electrical junction box, but may be formed as an independent body.

Figure 1:
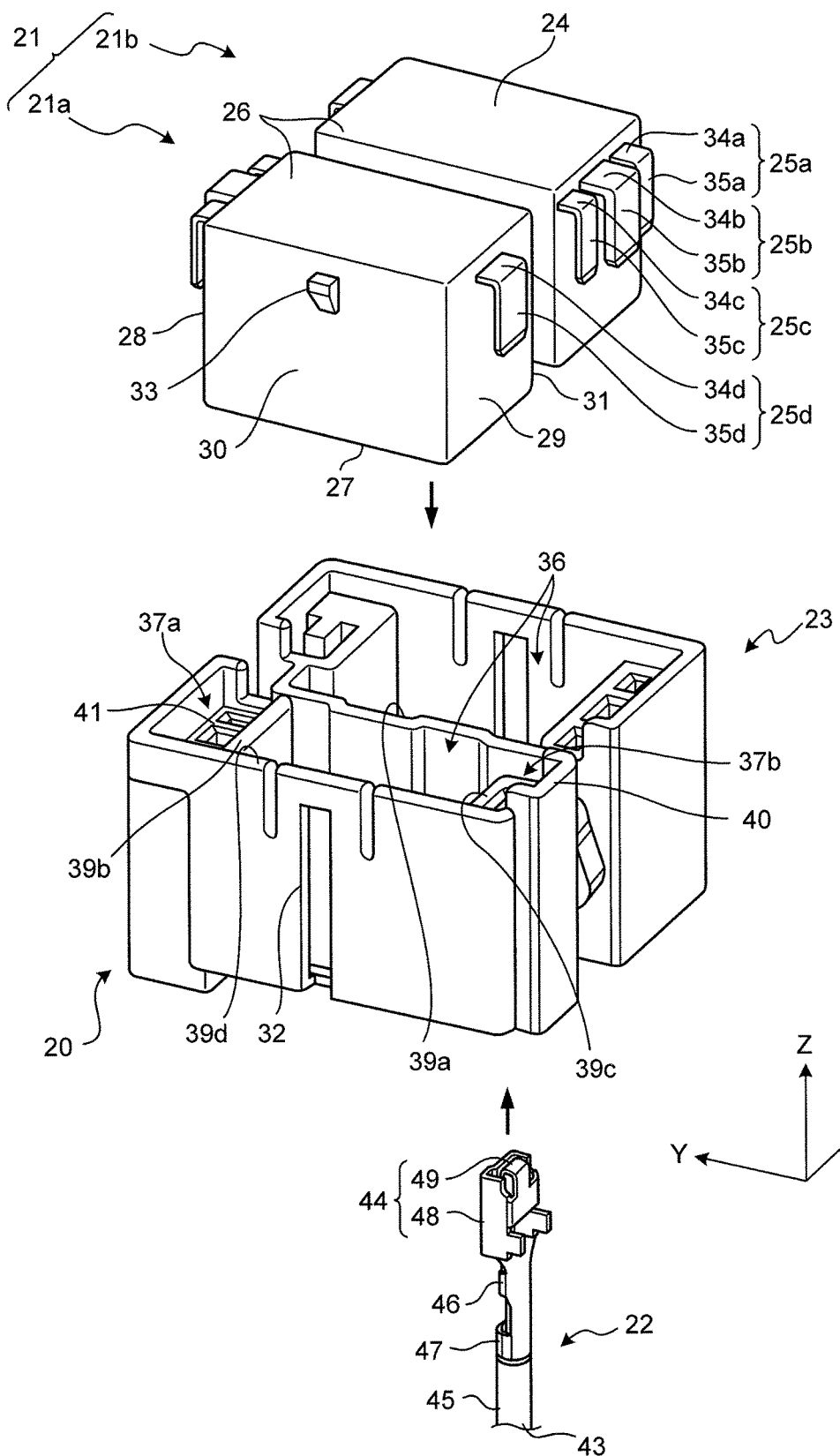
FIG. 1 is an assembly diagram of a relay module according to an embodiment of the present invention.
Figure 2:
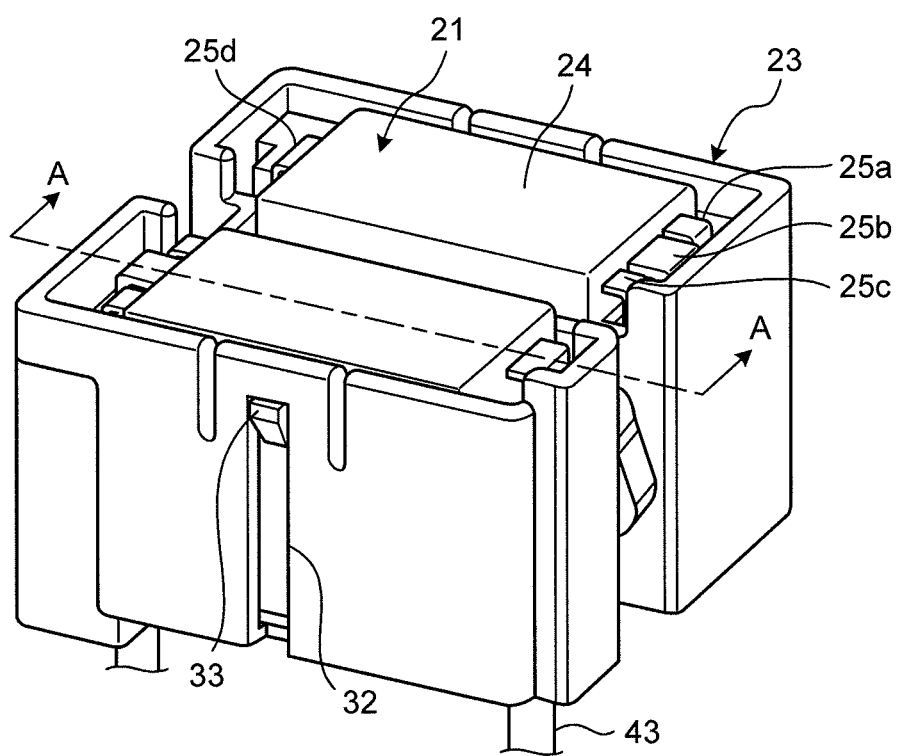
FIG. 2 is a diagram illustrating the entire configuration of the relay module illustrated in FIG. 1.
Figure 3:
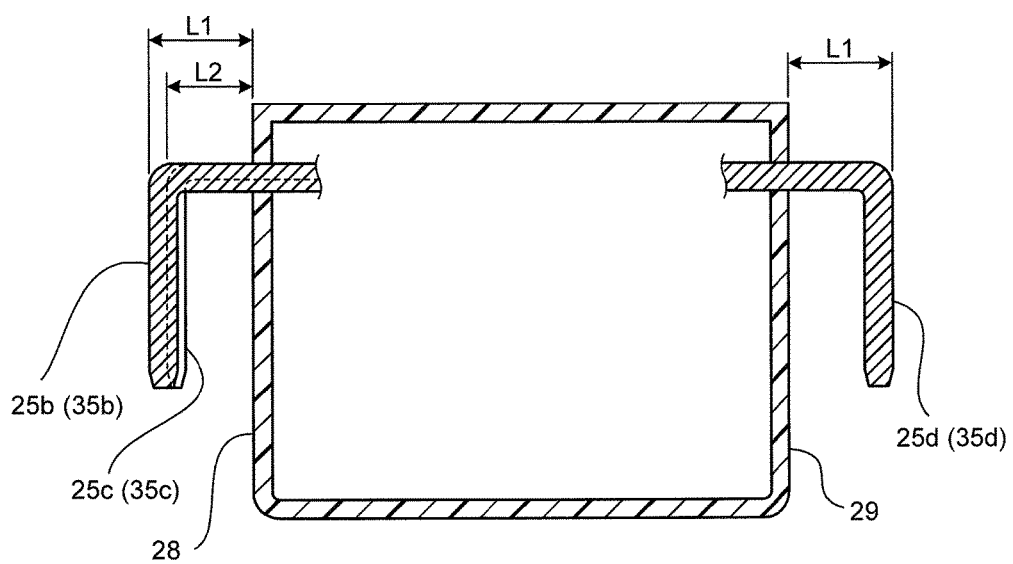
FIG. 3 is a cross-sectional view of the relay taken along arrow A-A in FIG. 2.
Figure 4:
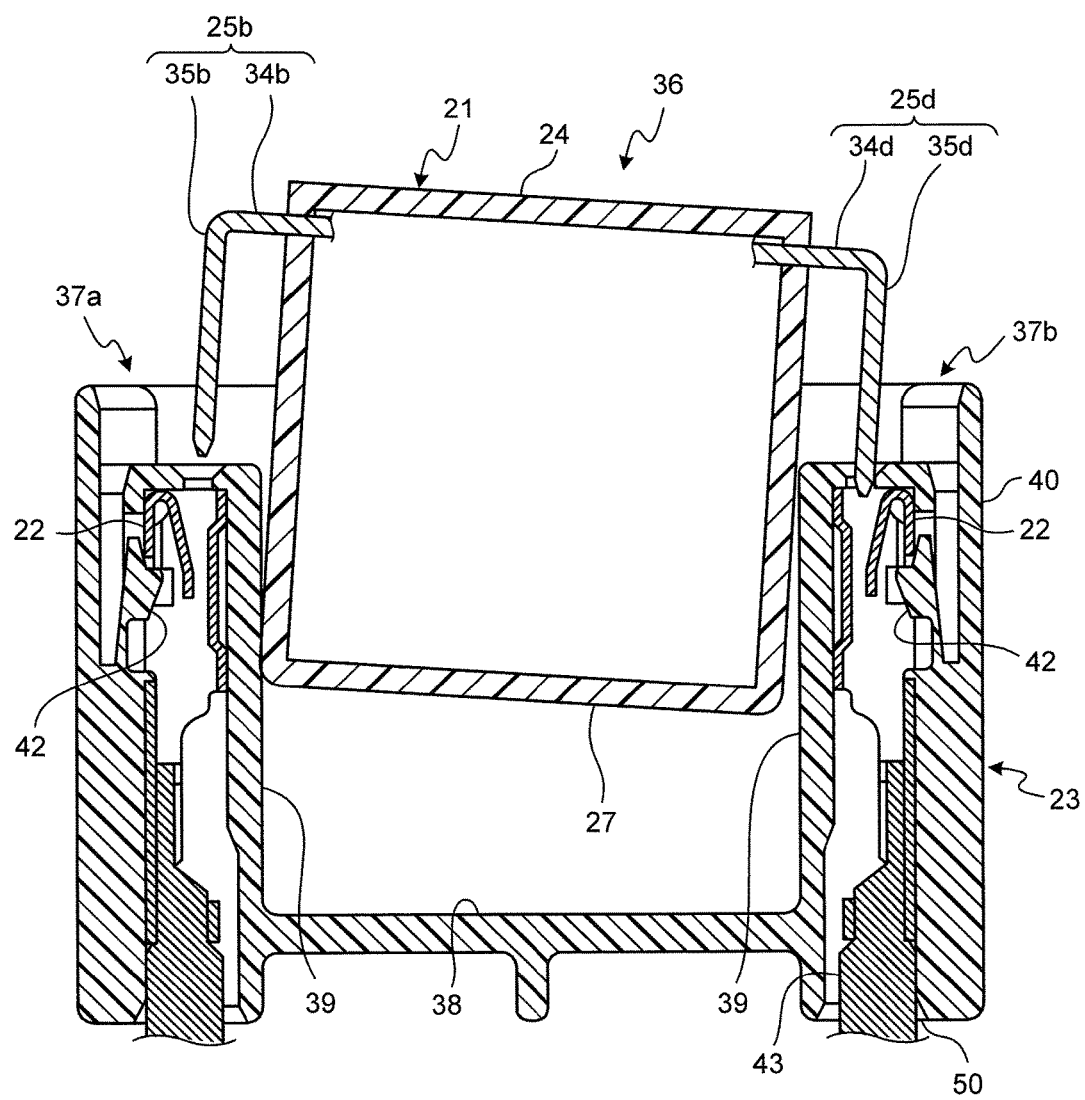
FIG. 4 is a cross-sectional view illustrating an operation of assembling a relay into a housing member.
Figure 5:
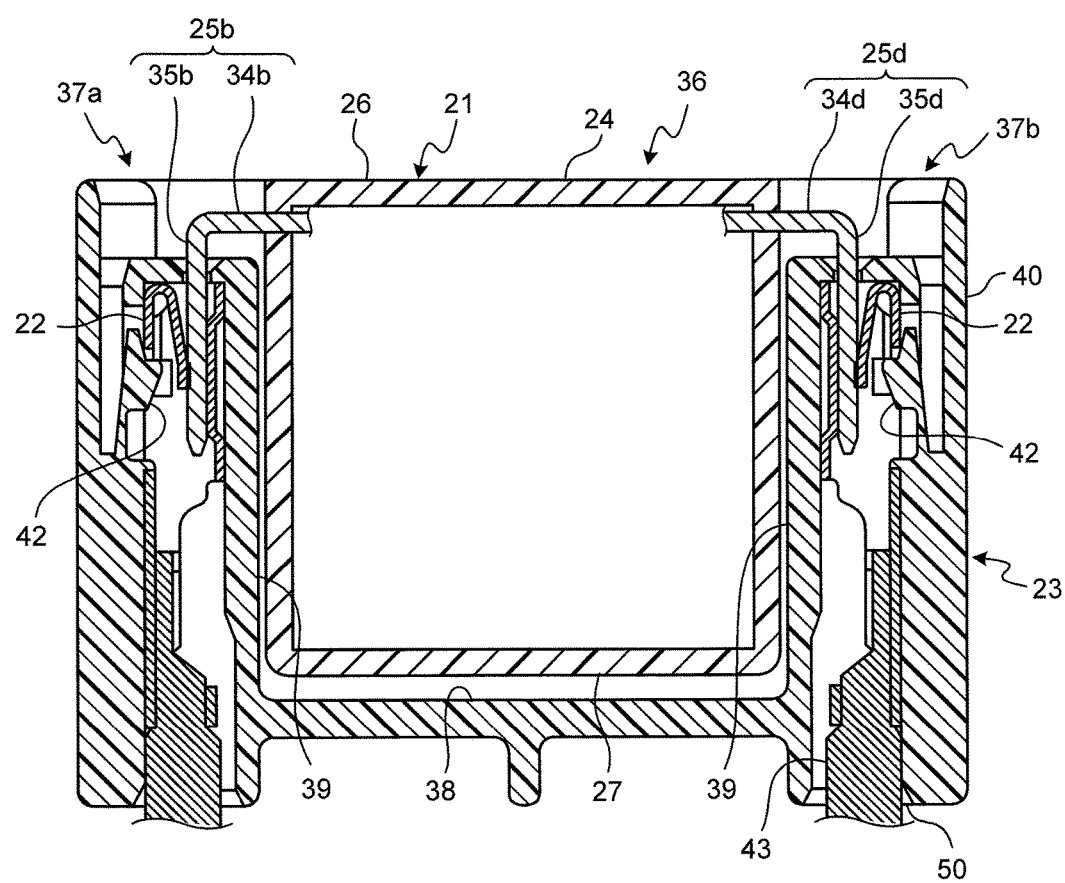
FIG. 5 is a cross-sectional view of a relay module, into which the relay has been assembled, taken along arrow A-A in FIG. 2.

FIG. 1 is an assembly diagram of a relay module 20 according to an embodiment. FIG. 2 is a diagram illustrating the entire configuration of the relay module 20 illustrated in FIG. 1. FIG. 3 is a cross-sectional view of the relay taken along arrow A-A in FIG. 2. FIG. 4 is a cross-sectional view illustrating an operation of assembling a relay into a housing member. FIG. 5 is a cross-sectional view of a relay module into which the relay illustrated in FIG. 4 has been assembled. In the following description, a direction indicated by arrow X in FIG. 1 is defined as a front-back direction, a direction indicated by arrow Y is defined as a right-left direction, and a direction indicated by arrow Z is defined as an up-down direction (hereinafter, the same applies to FIG. 2). However, the up-down direction, the right-left direction, and the front-back direction may not match the respective directions in a state in which the relay module 20 is actually mounted on a moving object. In FIGS. 3 to 5, various components accommodated in a relay main body 24 are not illustrated.

As illustrated in FIG. 1, the relay module 20 according to this embodiment has a configuration in which a relay 21, terminal fittings 22, and a housing member 23 are mutually assembled. In this embodiment, it is assumed that one relay module 20 includes two relays 21a and 21b. However, the number of relays constituting a relay module is not limited to two and the relay module may include only one relay or may include three or more relays. When the relay module includes plural relays, relays 21 having the configuration illustrated in FIG. 1 may be employed or relays having configurations (for example, FIGS. 6 and 7) other than the configuration illustrated in FIG. 1 may be mixed.

Each relay 21 includes the relay main body 24 which is a component main body having a rectangular parallelepiped shape and which is formed of a resin or the like and four plate-like lead terminals 25a to 25d which protrude from the relay main body 24. The relay main body 24 is a box-like container in which an electronic component and the like is accommodated. The relays 21a and 21b have the same configuration but the right and left sides thereof are reversed.

The relay main body 24 has a top surface 26 located above, a bottom surface 27 located below, a left side surface 28 and a right side surface 29 facing each other in the right-left direction, and a front surface 30 and a back surface 31 facing each other in the front-back direction. The relay main body 24 has a substantially rectangular parallelepiped shape which is long in the right-left direction, and four surfaces of the left side surface 28, the right side surface 29, the front surface 30, and the back surface 31 are set as side surfaces. The front surface 30 is provided with a locking protrusion 33 which engages with a penetration groove 32 formed in the housing member 23. The relay main body 24 according to this embodiment is formed in a rectangular parallelepiped shape, but may be formed in a square parallelepiped shape.

Each of the lead terminals 25a to 25d includes a plate-like base end 34 protruding from the side surfaces of the relay main body 24 and a plate-like contact portion 35 extending from the base end 34 and drooping along one of the opposite side surfaces of the relay main body 24. The lead terminals 25a to 25c among lead terminals 25 include base ends 34a to 34c perpendicularly protruding from the left side surface 28 of the relay main body 24 with a gap therebetween in the width direction (the front-back direction) of the relay main body 24 and contact portions 35a to 35c drooping along the left side surface 28 from the base ends 34a to 34c with a predetermined gap from the left side surface 28 of the relay main body 24. On the other hand, the lead terminal 25d includes a base end 34d perpendicularly protruding from the right side surface 29 of the relay main body 24 and a contact portion 35d drooping from the base end 34d with a predetermined gap from the right side surface 29 of the relay main body 24.

The base ends 34a to 34d protrude in parallel to the top surface 26 or the bottom surface 27, and the protruding position is set to the same height position below the top surface 26. On the other hand, the contact portions 35a to 35d extend in parallel with the opposite side surfaces of the relay main body 24 and the height positions of the tips (lower ends) thereof are set to the same height position above the bottom surface 27 of the relay main body 24. The widths in the front-back direction of the base ends 34a and 34c and the contact portions 35a and 35c of the lead terminals 25a and 25c are set to the same magnitude, and the widths in the front-back direction of the base ends 34b and 34d and the contact portions 35b and 35d of the lead terminals 25b and 25d are set to the same magnitude. The widths in the front-back direction of the base ends 34b and 34d and the contact portions 35b and 35d of the lead terminals 25b and 25d are set to be greater than the widths in the front-back direction of the base ends 34*a* and 34*c* and the contact portions 35*a* and 35*c* of the lead terminals 25*a* and 25*c*.

The housing member 23 is a resinous casing for receiving and holding the relay 21 and the terminal fittings 22 and includes a first housing chamber 36 that guides and accommodates the relay main body 24 therein and a second housing chamber 37 that accommodates and holds the terminal fittings 22 therein. In this embodiment, the housing member 23 is treated as a single member independent of an electrical junction box not illustrated. However, the housing member 23 may be formed as a part of a casing which is formed in the electrical junction box and may be formed as a unified body with the electrical junction box.

Two first housing chambers 36 are formed in the housing member 23 according to this embodiment, and two second housing chambers 37*a* and 37*b* are arranged with each first housing chamber 36 interposed therebetween. The lead terminals 25*a* to 25*c* are accommodated in the second housing chamber 37*a*, the lead terminal 25*d* is accommodated in the second housing chamber 37*b*, and the terminal fittings 22 are held at predetermined positions to correspond to the lead terminals 25 inserted into the second housing chambers 37.

As illustrated in FIGS. 4 and 5, the first housing chamber 36 is surrounded with a bottom wall 38 and wall portions 39 rising upright from the bottom wall 38 to form a concave space of which the top is opened to the outside. The wall portions 39 rise upright from the bottom wall 38 so as to surround the side surfaces (the left side surface 28, the right side surface 29, the front surface 30, and the back surface 31) of the relay main body 24 from four directions and guide and accommodate the relay main body 24 in the first housing chamber 36. The first housing chamber 36 is formed in a rectangular parallelepiped shape which is slightly larger than the relay main body 24, smoothly accommodates the relay main body 24 guided by the wall portions 39 therein, and holds the posture of the relay main body 24 by causing four side surfaces of the accommodated relay main body 24 to interfere with the wall portions 39.

As illustrated in FIG. 1, the penetration groove 32 directing the first housing chamber 36 to the outside of the housing member 23 is formed in a wall portion 39*d* (the wall portion facing the front surface 30 of the relay body 24) other than a wall portion 39*a* partitioning the neighboring first housing chambers 36 and wall portions 39*b* and 39*c* as partition walls from the second housing chambers 37 among the four wall portions 39 forming the first housing chamber 36 so as to extend in the height direction of the wall portions 39*d*. The penetration groove 32 is configured to lock the locking protrusion 33 of the relay main body 24 when the relay main body 24 is accommodated in the first housing chamber 36.

The second housing chambers 37*a* and 37*b* are disposed outside the wall portions 39*b* and 39*c* of the first housing chamber 36, that is, on the opposite sides of the first housing chamber 36 with the wall portions 39*b* and 39*c* interposed therebetween, and are surrounded with a rectangular tubular frame formed by the wall portions 39*b* and 39*c* and a frame portion 40 of the housing member 23 to form a rectangular parallelepiped space of which the top and the bottom are opened to the outside. In the second housing chamber 37*a* disposed outside the wall portion 39*b* of the first housing chamber 36, at least the vicinity of an opening into which the lead terminals 25 are inserted is partitioned by a partition wall 41 formed over the wall portion 39*b* and the frame portion 40. The second housing chambers 37*a* and 37*b* are provided with lances 42 (locking pieces) at positions facing the terminal fittings 22 as illustrated in FIGS. 4 and 5. Each lance 42 serves to hold the corresponding terminal fitting 22 in the second housing chamber 37, is integrally molded to extend in a cantilever shape from the wall portion 39 or the frame portion 40 to the second housing chamber 37 so as to be elastically deformed.

The terminal fitting 22 is an interface member that is connected to a terminal portion of an electrical wire 43 so as to electrically connect the electrical wire 43 to the relay 21. Only one terminal fitting 22 is illustrated in FIG. 1, but four terminal fittings are disposed to correspond to the lead terminals 25*a* to 25*d* and are formed by machining a conductive metal sheet.

The terminal fittings 22 have the contact portions 35*a* and 35*d* fitted thereto and each includes a female fitting portion 44 which supports the contact portion 35, a pair of core clamping pieces 46 which caulks a core wire exposed by peeling an insulating coating 45 of the terminal portion of the electrical wire 43, and a pair of external clamping pieces 47 which caulks a tip of the insulating coating 45 of the electrical wire 43. The fitting portion 44 includes a tubular portion 48 having a rectangular tubular shape and having a space into which the contact portions 35*b* and 35*d* are inserted and a spring portion 49 which is formed by folding a plate-like member connected to a side plate forming the tubular portion 48 from the vicinity of the insertion hole of the tubular portion 48 into the space. The contact portions 35 are supported by the fitting portion 44 by pressing the contact portions 35 inserted into the space of the tubular portion 48 against another side plate facing the side plate with an elastic force of the spring portion 49. Since the dimensions of the tubular portions 48 and the like are appropriately set depending on the sizes of the inserted contact portions 35 and the terminal fittings 22 have the same basic configuration, only the terminal fitting 22 into which the contact portion 35*d* is inserted is illustrated in FIG. 1. In this embodiment, two types of the terminal fittings 22 into which the contact portions 35*a* and 35*c* are inserted and the terminal fittings 22 into which the contact portions 35*b* and 35*d* are inserted are provided to correspond to the sizes of the contact portions 35 (35*a* to 35*d*). The terminal fittings 22 are not limited to the structure in this embodiment. For example, a terminal fitting called a fastening type may be employed.

In this embodiment, three terminal fittings 22 are accommodated in the second housing chamber 37*a* and one terminal fitting 22 is accommodated in the second housing chamber 37*b*. The three terminal fittings 22 accommodated in the second housing chamber 37*a* may be connected to each other or may be accommodated separately from each other. The terminal fittings 22 are supported in the second housing chamber 37 by the lances 42.

Each lance 42 forms a so-called spring mechanism, serves to press the lower edge of the spring portion 49 of the terminal fitting 22 with a restoration force from elastic deformation and to lock the lower edge, achieves fixation of the terminal fitting 22 to the second housing chamber 37, and holds the terminal fitting 22 in the second housing chamber 37. In this embodiment, one lance 42 extends from the frame portion 40 and the other lance 42 extends from the wall portion 39 as illustrated in FIG. 5, but the right and left lances 42 may be disposed to extend from the frame portion 40 or the wall portion 39 so as to be symmetric with respect to each other.

For example, in order to accommodate the terminal fittings 22 in the second housing chamber 37*b* and to hold the terminal fittings using the lances 42, the terminal fittings 22 are inserted from an opening 50 (FIG. 5) on the bottom of the second housing chamber 37b. Then, the terminal fittings 22 are inserted into the second housing chamber 37b until the tips (the fitting portions 44) thereof come in contact with the lances 42. When an upward force (insertion force) is applied to the terminal fitting 22 so as to further insert the terminal fittings 22 into the second housing chamber 37b in this state, the lances 42 are pressed by the terminal fittings 22 and are elastically deformed to approach the frame portion 40. When an insertion force is applied to the terminal fittings 22 against the restoration force from elastic deformation, the terminal fittings 22 move upward in a state in which the lance 42 comes in sliding contact with the fitting portion 44. When the terminal fittings 22 move and the lances 42 relatively reach the lower edges of the spring portions 49 along the fitting portions 44, the lances 42 are elastically deformed to engage with the lower edges of the spring portions 49. By causing the lances 42 to engage with the terminal fittings 22 in this way, the terminal fittings 22 are locked to the lances 42. Accordingly, it is possible to prevent the terminal fittings 22 from getting out of the second housing chamber 37b. That is, the terminal fittings 22 are held in the second housing chamber 37b.

On the other hand, in this embodiment, the position in the up-down direction of the relay 21 in a state in which the relay 21 is accommodated in the housing member 23, that is, when the contact portions 35 of the lead terminals 25 are fitted to the fitting portions 44 of the terminal fittings 22, is set to a predetermined height position such that the top surface 26 of the relay 21 does not protrude upward from the top of the housing member 23 as illustrated in FIG. 5. Here, the height position of the top surface 26 can be determined depending on the positions at which the contact portions 35 of the lead terminals 25 are fitted to the spring portions 49 of the terminal fittings 22. That is, each terminal fitting 22 is held in the second housing chamber 37 at the height position at which the spring portion 49 holding the contact portion 35 of the lead terminal 25 faces the side surface of the relay main body 24 accommodated in the first housing chamber 36 with the wall portion 39 interposed therebetween. The top end face of the wall portion 39 is disposed at a predetermined height position below the top end surface of the housing member 23 so as not to contact with the base end 34 of the lead terminal 25 when the contact portion 35 of the lead terminal 25 is fitted to the spring portion 49 of the terminal fitting 22, and the bottom wall 38 is disposed at a predetermined height position not coming in contact with the bottom surface 27 of the relay main body 24. Accordingly, except for the portions in which the contact portions 35 of the lead terminals 25 are fitted to the spring portions 49 of the terminal fittings 22, the relay 21 is held in the housing member 23 without interfering with the bottom wall 38 or the top end face of the wall portion 39 in the height direction of the housing member 23. Accordingly, it is possible to satisfactorily bring the lead terminals 25 into contact with the terminal fittings 22 and thus to stabilize a holding force of the relay 21 in the housing member 23.

In assembling the relay 21 into the housing member 23 in this embodiment, the relay main body 24 is guided along the wall portion 39 and is inserted into the first housing chamber 36. When the vicinity of the lower end of the relay main body 24 is accommodated in the first housing chamber 36, the tips (lower ends) of the contact portions 35 of the lead terminals 25 are positioned to face the fitting portions 44 above the terminal fittings 22. When the relay main body 24 is inserted to the vicinity of the bottom wall 38 of the first housing chamber 36 in a state in which the contact portions 35 are positioned in this way, the contact portions 35 are inserted into the tubular portions 48 of the fitting portions 44 and the contact portions 35 are supported (fitted) with the pressing force of the spring portions 49. In the relay module 20 assembled in this way, as illustrated in FIGS. 2 and 5, the relay 21 is held in the housing member 23 and the relay 21 is electrically connected to the electrical wire 43 via the terminal fittings 22.

Distinctive configurations of this embodiment will be described below. In the relay 21 according to this embodiment, plural (three) lead terminals are disposed on one side surface (the left side surface 28) of the relay main body 24, and the thickness and the width in the front-back direction of the lead terminal 25b located at the center among these lead terminals are set to be greater than those of the lead terminals 25a and 25c located at both ends. That is, the lead terminal 25b is set to have the highest rigidity out of the lead terminals 25a to 25c disposed on the left side surface 28 of the relay main body 24 depending on the differences in thickness and width.

In this embodiment, a side surface, which faces the opposite side to the left side surface 28, of the lead terminal 25b having the highest rigidity (the outside surface of the contact portion 35b) is disposed to protrude more in the direction in which it gets apart from the left side surface 28 of the relay main body 24 than the side surfaces, which face the opposite side to the left side surface 28, of the other lead terminals 25a and 25c (the outside surfaces of the contact portions 35a and 35c). That is, when the distance between the outside surface of the contact portion 35b and the left side surface 28 is defined as L1 and the distance between the outside surfaces of the contact portions 35a and 35c and the left side surface 28 is defined as L2, as illustrated in FIG. 3, L1 is set to be greater than L2.

According to this configuration, when the relay 21 is transported in a state in which the lead terminals 25 are exposed without receiving the relay 21 in the housing member 23, an external force (an external force due to contact) is first applied to the lead terminal 25b disposed to protrude outside among three lead terminals 25a to 25c. For example, when another member comes in contact with the relay 21 from the left side of FIG. 3, the member first comes in contact with the lead terminal 25b and an external force is concentrated on the lead terminal 25b. However, since the rigidity of the lead terminal 25b is set to the highest, it is possible to prevent deformation due to an external force. Since an external force applied to the lead terminals 25a and 25c having a relatively low rigidity can be reduced by causing the external force to act on the lead terminal 25b, it is possible to prevent deformation of the lead terminals 25a to 25c.

As illustrated in FIG. 1, the insertion holes of the terminal fittings 22 are partitioned by the partition wall 41 in the second housing chamber 37 and set to the same height position. Accordingly, for example, the contact portions 35a to 35c of the lead terminals 25a to 25c are substantially simultaneously inserted into the insertion holes. However, the relay 21 may be inserted into the housing member 23 in a state in which the relay is inclined, and the contact portions 35a and 35c having a relatively low rigidity may be earlier inserted into the insertion holes than the contact portion 35b having the highest rigidity depending on the inclination direction. In this case, the lead terminals 25a and 25c may be deformed due to an external force acting thereon at the time of inserting the contact portions 35a and 35c into the insertion holes.

Therefore, in this embodiment, the length of the contact portion 35b of the lead terminal 25b among the lead terminals 25a to 25c is set such that the tip in the insertion direction of the contact portion 35b is positioned below the tips in the insertion direction of the contact portions 35a and 35c of the other lead terminals 25a and 25c. Accordingly, even when the relay 21 is inclined in any direction, the contact portions 35a and 35c can be prevented from being earlier inserted into the insertion holes than the contact portion 35b and it is thus possible to prevent deformation of the lead terminals 25a and 25c.

The heights of the insertion holes of the terminal fittings 22 instead of the lengths of the contact portions 35 of the lead terminals 25 may be appropriately set. For example, the height position of the insertion hole into which the contact portion 35b is inserted is set to be higher (the upper side in FIG. 1) than the height positions of the insertion holes into which the contact portions 35a and 35c are inserted such that the contact portion 35b of the lead terminal 25b among the lead terminals 25a to 25c is earlier inserted than the other contact portions 35a and 35c. Accordingly, since the contact portions 35a and 35c can be prevented from being earlier inserted into the insertion holes than the contact portion 35b, it is possible to prevent deformation of the lead terminals 25a and 25c. In this way, by appropriately setting at least one of the lengths of the contact portions 35 of the lead terminals 25 and the height positions of the insertion holes, it is possible to prevent deformation of the lead terminals 25 at the time of insertion thereof.

In the relay 21 according to this embodiment, the lead terminal 25b having the highest rigidity among plural (three) lead terminals 25a to 25c disposed on the left side surface 28 of the relay main body 24 is disposed at the center. However, when three or more lead terminals 25 are disposed on one side surface of the relay main body 24, the lead terminal 25 having the highest rigidity may be disposed at one of both ends. However, in order to cause an external force to stably act on the lead terminal 25 having the highest rigidity, it is preferable that the lead terminal having the highest rigidity be disposed at an inside position other than the positions of both ends.

In the relay 21 according to this embodiment, the thickness of the lead terminal 25b located at the center among the three lead terminals 25a to 25c disposed on the left side surface 28 of the relay main body 24 is set to be larger than the thicknesses of the other lead terminals 25a and 25c. Accordingly, for example, when points at which the three lead terminals 25a to 25c are bent in an L shape are set to positions at which distances from the left side surface 28 are the same, the contact portion 35b having the highest rigidity is disposed to protrude more outward than the other contact portions 35a and 35c. On the other hand, for example, when the thicknesses of the three lead terminals 25a to 25c are the same, the contact portion 34b of the lead terminal 25b can be disposed to protrude outward by setting the bending position at which the base end 34b of the lead terminal 25b is bent in an L shape to a position farther separated from the left side surface 28 of the relay main body 24 than the bending positions of the other lead terminals 25a and 25c.

A type of electronic component other than the relay 21 illustrated in FIG. 1 will be described below. In the above-mentioned embodiment, the relay module 20 into which the relay 21 illustrated in FIG. 1 is assembled is described as the electronic component assembly structure according to the present invention, but the configuration of the electronic component is not limited to this example. An electronic component having the following configuration may be employed. That is, the electronic component includes a component main body having a rectangular parallelepiped shape (which includes a square parallelepiped shape) and plural lead terminals, the lead terminals are disposed to droop along the corresponding side surface of the component main body and plural lead terminals having different rigidities are arranged in the width direction of at least one side surface of the component main body. Here, the lead terminal having the highest rigidity among the plural lead terminals is disposed to protrude more in the direction in which it gets apart from the side surface of the component main body than the other lead terminals. For example, the same advantages as in the relay 21 illustrated in FIG. 1 can be achieved in electronic components (for example, relays) having the following configurations. Differences from the relay 21 illustrated in FIG. 1 will be described below.

Figure 6:
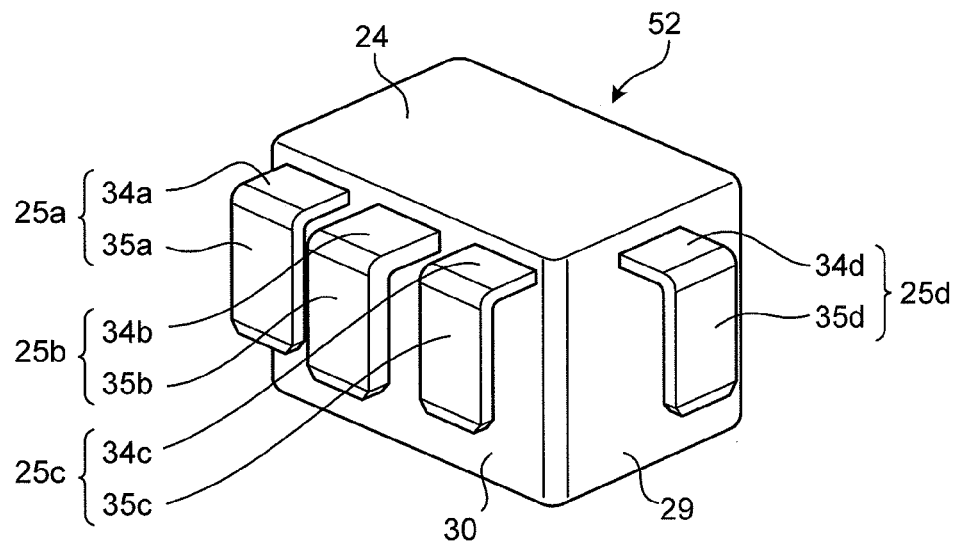
FIG. 6 is a perspective view of a relay according to another embodiment.

FIG. 6 is a perspective view illustrating another example of the relay according to this embodiment. In the relay 21 illustrated in FIG. 1, each of a pair of opposite side surfaces of the relay main body 24 is provided with the lead terminals 25, but two neighboring side surfaces 29 and 30 may be provided with the lead terminals 25 like a relay 52 illustrated in FIG. 6. In the example illustrated in FIG. 6, the contact portion 35b of the central lead terminal 25b among the plural lead terminals 25a to 25c disposed on one side surface 30 of the relay main body 24 is disposed to protrude more in the direction in which it gets apart from the side surface 30 of the relay main body 24 than the contact portions 35a and 35c of the other lead terminals 25a and 25c. In this embodiment, in the housing member 23 receiving the relay 52, the second housing chamber 37 is formed at two positions adjacent to the first housing chamber 36 to correspond to the arrangement of the lead terminals 25 (25a to 25d) and the second housing chambers 37 are arranged to be perpendicular to each other. In each second housing chamber 37, the terminal fittings 22 corresponding to the number of lead terminals 25 inserted into the second housing chamber 37 are held to correspond to the lead terminals 25.

In the relay 52 illustrated in FIG. 6, one side surface among two neighboring side surfaces of the relay main body 24 is provided with three lead terminals and the other side surface is provided with one lead terminal, but the numbers of lead terminals 25 disposed on the side surfaces are not particularly limited except for a case where all the side surfaces are provided with the lead terminals 25, respectively, and may be equal to or different from each other. The number of side surfaces of the relay main body 24 on which the lead terminals 25 are disposed is not limited to two, and may be one or three or more. In this case, the second housing chambers 37 can be disposed at one or more positions adjacent to the first housing chamber 36 depending on the arrangement of the lead terminals 25.

Figure 7:
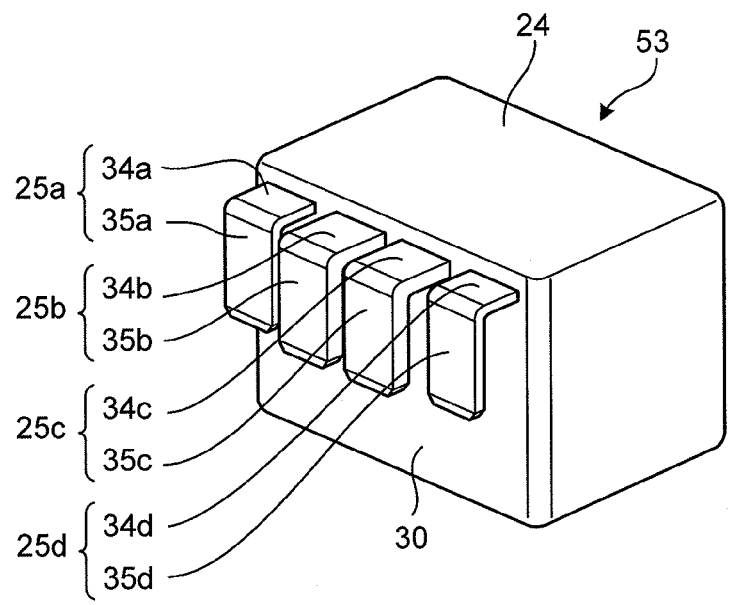
FIG. 7 is a perspective view of a relay according to another embodiment.

FIG. 7 is a perspective view illustrating another example of the relay according to this embodiment. FIG. 7 illustrates a relay 53 in which four lead terminals 25a to 25d are disposed on one side surface of the relay main body 24. In the example illustrated in FIG. 7, the contact portions 35b and 35c of the lead terminals 25b and 25c among the lead terminals 25a to 25d disposed on the front surface 30 of the relay main body 24 are disposed to protrude more in the direction in which it gets apart from the side surface 30 of the relay main body 24 than the contact portions 35a and 35d of the other lead terminals 25a and 25d. In this case, the lead terminals 25b and 25c are set to have the same thickness and are set to have a thickness larger than that of the other lead terminals 25a and 25d. Accordingly, since the lead terminals 25b and 25c have a rigidity higher than that of the other lead terminals 25a and 25d, it is possible to prevent deformation of all the lead terminals 25a to 25d by disposing two lead terminals having a higher rigidity to protrude more outward. In this embodiment, in the housing member 23 receiving the relay 53, the second housing chamber 37 is disposed at one position adjacent to the first housing chamber 36 to correspond to the arrangement of the lead terminals 25. The same number of terminal fittings 22 is held in the second housing chamber 37 to correspond to the four lead terminals 25a to 25d.

Figure 8A:
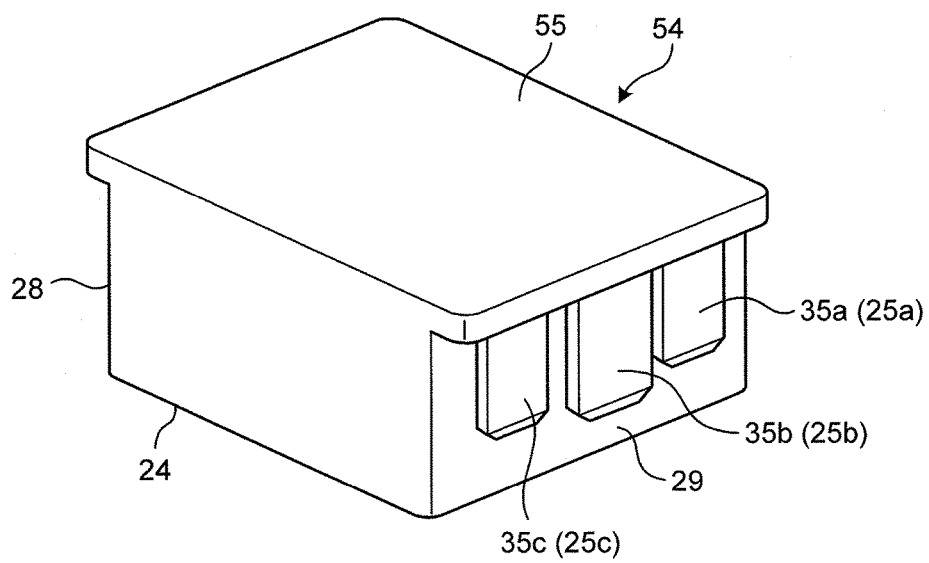
FIG. 8A is a perspective view of a relay according to another embodiment.
Figure 8B:
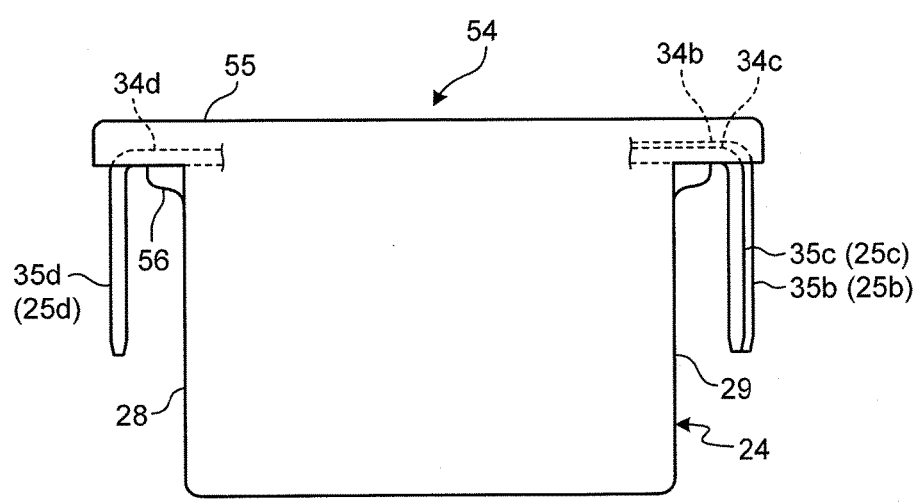
FIG. 8B is a side view of the relay illustrated in FIG. 8A.
Figure 9:
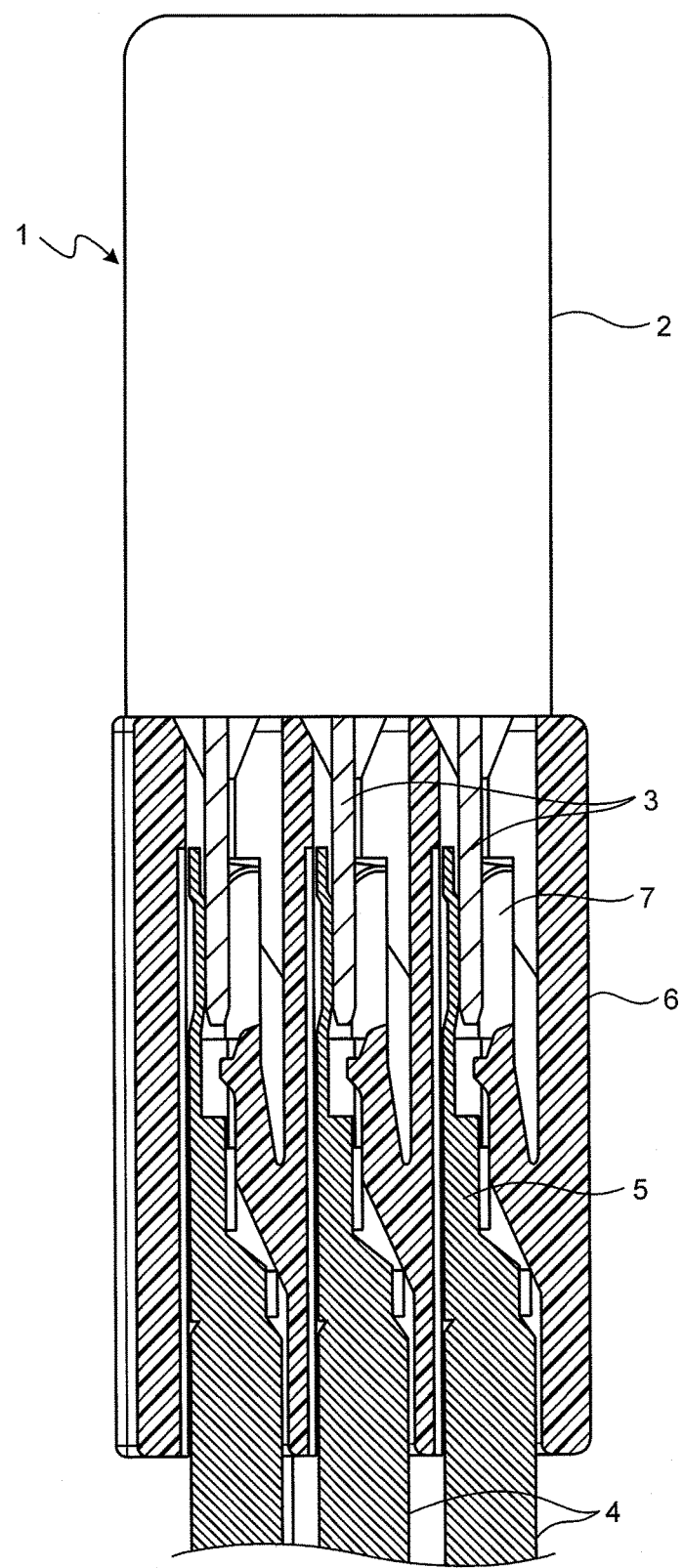
FIG. 9 is a longitudinal-sectional view of a relay module according to the related art.
Figure 10:
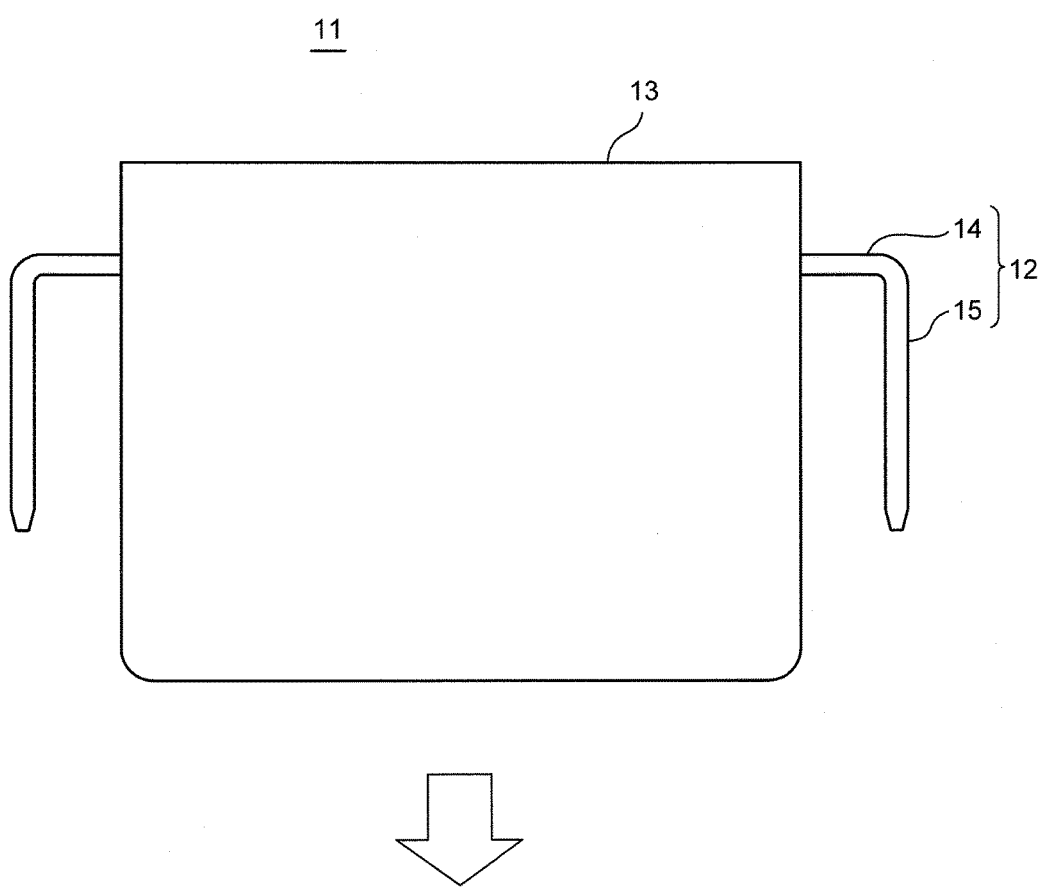
FIG. 10 is a side view illustrating an example of a relay.

In the above-mentioned relays, the base ends 34 of the lead terminals 25 are completely exposed, but at least a part of each base end 34 may be covered with a resin. FIG. 8A is a perspective view illustrating an appearance of a relay in which the base ends 34 are covered with a resin and which is another example of the relay according to this embodiment and FIG. 8B is a side view of the relay illustrated in FIG. 8A. A relay 54 illustrated in FIGS. 8A and 8B is equal to the relay illustrated in FIG. 1, in that three lead terminals 25a to 25c are disposed to face the left side surface 28 of the relay main body 24 and one lead terminal 25d is disposed to face the right side surface 29.

As illustrated in FIG. 8A, a plate-like insulating member 55 is attached to the relay 54 according to this embodiment along one surface of the relay main body 24. The insulating member 55 is formed in a substantially rectangular shape in a plan view by molding an insulating resin or the like. The insulating member 55 extends in a direction perpendicular to the side surfaces 28 and 29 facing the lead terminals 25 and is formed to cover the base ends 34 of the lead terminals 25.

As illustrated in FIG. 8B, the base ends 34 are covered with the insulating member 55 in the axial direction thereof and the contact portions 35 are disposed to protrude from the bottom surface of the insulating member 55. Protrusions 56 are formed to have a level difference at positions at which the insulating member 55 and the side surfaces 28 and 29 intersect each other. The protrusions 56 come in contact with the top end faces of the wall portions 39 in assembling the relay 54 into the housing member 23.

By disposing the insulating member 55 in the relay main body 24, the base ends 34 of the lead terminals 25 can be supported from the upper side by the insulating member 55. Accordingly, since a load applied to the lead terminals 25 at the time of insertion of the lead terminals 25 into the terminal fittings 22 can be greatly reduced, it is possible to satisfactorily prevent deformation of the lead terminals 25, in addition to the effects of the relay 21 illustrated in FIG. 1.

In this way, by disposing the lead terminal having a highest rigidity among the plural lead terminals disposed on one side surface of the component main body so as to protrude more in the direction in which it gets apart from the side surface of the component main body than the other lead terminals, an external force is concentrated on the lead terminal having a highest rigidity, for example, when the electronic component is brought into contact with another member or the like and thus the external force acts thereon. Accordingly, since an external force can be prevented from being applied to the lead terminals having relatively low rigidities, it is possible to prevent deformation of a lead terminal.

According to this configuration, since the lead terminal having a highest rigidity can be inserted into the terminal fitting earlier than the other lead terminals, it is possible to reduce a load in inserting the lead terminal having a relatively low rigidity and thus to prevent deformation of the lead terminal.

According to the present invention, it is possible to prevent deformation of a lead terminal.

While the embodiments of the present invention have been described in detail with reference to the drawings, the above-mentioned embodiments are only examples of the present invention and the present invention is not limited to the embodiments. Therefore, modifications in design or the like without departing from the gist of the present invention are included in the scope of the present invention.

For example, the embodiments have described the relay module using a relay as an electronic component, but the electronic component is not limited to the relay. The embodiments may be applied to other electronic components as long as electronic components include a component main body and lead terminals having configurations and appearance similar to the relay main body and the lead terminals according to the embodiments. Specifically, the embodiments may be applied to, for example, a control module or a fuse in which components such as an electronic circuit board are accommodated in a resinous case.

What is claimed is:
1. An electronic component comprising:
a component main body having a rectangular parallelepiped shape; and
a plurality of lead terminals each having L-shaped configuration and generally constant cross-section, wherein
each of the lead terminals comprises a base end having a planar shape extending from the component main body in a first direction and a contact portion extending from the base end and is disposed to extend along a side surface of the component main body in a second direction perpendicular to the first direction, and
the plurality of the lead terminals having different rigidities are arranged in a width direction corresponding to a third direction perpendicular to the first and second directions of at least one side surface of the component main body, and the base end of the lead terminal having a highest rigidity in the second and third directions among the plurality of the lead terminals is disposed to protrude further in the first direction than the base ends of the other lead
terminals, wherein the base end of the lead terminal having the highest rigidity has a greater thickness in the second direction than the thickness of the base ends of the other lead terminals having a lower rigidity.
2. The electronic component according to claim 1, wherein
a tip in an insertion direction of the lead terminal having a highest rigidity is positioned below than those of the other lead terminals.
3. An electronic component assembly structure comprising:
an electronic component which includes a component main body having a rectangular parallelepiped shape and a plurality of lead terminals each having L-shaped configuration and generally constant cross-section;
a housing member in which the electronic component is inserted and accommodated; and
a plurality of terminal fittings which are held in the housing member and to which the plurality of the lead terminals are fitted, wherein
each of the lead terminals comprises a base end having a planar shape extending from the component main body in a first direction and a contact portion extending from the base end and disposed to extend along a side surface of the component main body in a second direction perpendicular to the first direction, the plurality of the lead terminals having different rigidities are arranged in a width direction corresponding to a third direction perpendicular to the first and second directions of at least one side surface of the component main body, and the base end of the lead terminal having a highest rigidity in the second and third directions among the plurality of the lead terminals is disposed to protrude further in the first direction than the base ends of the other lead terminals, the plurality of the terminal fittings are positioned such that the lead terminal having a highest rigidity among the plurality of the lead terminals arranged in the width direction of one side surface of the component main body is first inserted therein, and the electronic component is inserted and accommodated in the housing member, the plurality of the lead terminals come in contact with the plurality of the terminal fittings, respectively, and the electronic component is assembled into the housing member, wherein the base end of the lead terminal having the highest rigidity has a greater thickness in the second direction than the thickness of the base ends of the other lead terminals having a lower rigidity.

4. The electronic component assembly structure according to claim 3, wherein:

each of the lead terminals comprises a base end having a planar shape extending from the component main body and a contact portion extending from the base end, and the base end of the lead terminal having the highest rigidity among the plurality of the lead terminals is disposed to protrude more in the direction in which it gets apart from the corresponding side surface of the component main body than the base ends of the other lead terminals.

5. The electronic component assembly structure according to claim 3, wherein at least one terminal fitting of the plurality of the terminal fittings is connected to an electrical wire so as to electrically connect the electrical wire to the electronic component when the electronic component is accommodated in the housing member.

\* \* \* \* \*